US007210093B1

(12) United States Patent
Dutta

(10) Patent No.: US 7,210,093 B1
(45) Date of Patent: Apr. 24, 2007

(54) METHOD, SYSTEM, AND PROGRAM FOR DISPLAYING PAGES DOWNLOADED FROM OVER A NETWORK IN AN APPLICATION WINDOW

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/522,201

(22) Filed: Mar. 9, 2000

(51) Int. Cl.
*G06F 17/00* (2006.01)
*G06F 3/00* (2006.01)
*G09G 5/00* (2006.01)

(52) U.S. Cl. .................. 715/501; 715/513; 715/526; 715/788; 709/203; 345/635

(58) Field of Classification Search ............... 715/500, 715/501, 513, 526, 788, 754, 792; 345/635
See application file for complete search history.

(56) References Cited

U.S. PATENT DOCUMENTS

| | | | |
|---|---|---|---|
| 4,712,191 A | | 12/1987 | Penna |
| 5,467,102 A | * | 11/1995 | Kuno et al. ............. 345/1.3 |
| 5,513,342 A | * | 4/1996 | Leong et al. ............. 715/798 |
| 5,558,520 A | | 9/1996 | Werzberger |
| 5,602,996 A | * | 2/1997 | Powers et al. ............. 715/807 |
| 5,625,781 A | * | 4/1997 | Cline et al. .............. 345/854 |
| 5,639,240 A | | 6/1997 | Werzberger |
| 5,708,826 A | | 1/1998 | Ikeda et al. |
| 5,712,995 A | * | 1/1998 | Cohn ..................... 715/792 |
| 5,734,380 A | * | 3/1998 | Adams et al. ............. 715/804 |

(Continued)

FOREIGN PATENT DOCUMENTS

CA 2279145 * 1/2000

(Continued)

OTHER PUBLICATIONS

Lopetzky et al., "Visual Preview for Link Traversal on the World Wide Web," Computer Networks, vol. 31, No. 11-16, May 17, 1999, pp. 1525-1532.*

(Continued)

*Primary Examiner*—William Bashore
*Assistant Examiner*—Maiknanh Nguyen
(74) *Attorney, Agent, or Firm*—David W. Victor; Konrad Raynes & Victor LLP

(57) ABSTRACT

Disclosed is a system, method, and program for displaying pages in a viewer program on a computer display monitor. The viewer program displays an application window. The viewer program downloads a first and second pages from one of multiple servers over a network and then automatically concurrently displays the first page in a first window pane and the second page in a second window pane in the application window according to predefined settings specifying how pages are to be displayed in the first and second panes. The viewer program then downloads a third page from one of multiple servers over the network and automatically concurrently displays the third page in one of the first and second panes and one of the first and second pages in the other pane according to the predefined settings. A fourth page is then downloaded from one of multiple servers over the network and the viewer program then automatically concurrently displays the third and fourth pages in the first and second panes according to the predefined settings.

21 Claims, 7 Drawing Sheets

U.S. PATENT DOCUMENTS

| | | | |
|---|---|---|---|
| 5,771,042 A * | 6/1998 | Santos-Gomez | 715/800 |
| 5,784,058 A * | 7/1998 | LaStrange et al. | 345/738 |
| 5,835,091 A | 11/1998 | Bailey et al. | |
| 5,847,703 A | 12/1998 | Teicher et al. | |
| 5,847,706 A * | 12/1998 | Kingsley | 715/788 |
| 5,877,757 A * | 3/1999 | Baldwin et al. | 715/705 |
| 5,918,239 A * | 6/1999 | Allen et al. | 715/526 |
| 5,920,315 A * | 7/1999 | Santos-Gomez | 715/792 |
| 5,929,849 A | 7/1999 | Kikinis | |
| 5,933,142 A | 8/1999 | LaStrange et al. | 345/738 |
| 5,953,019 A | 9/1999 | Shimakawa et al. | |
| 5,963,964 A | 10/1999 | Nielsen | |
| 6,008,809 A * | 12/1999 | Brooks | 715/792 |
| 6,009,429 A * | 12/1999 | Greer et al. | 707/10 |
| 6,021,418 A | 2/2000 | Hansen et al. | |
| 6,133,916 A * | 10/2000 | Bukszar et al. | 715/744 |
| 6,289,361 B1 * | 9/2001 | Uchida | 715/501.1 |
| 6,448,986 B1 * | 9/2002 | Smith | 715/801 |
| 6,456,305 B1 * | 9/2002 | Qureshi et al. | 715/800 |
| 6,486,895 B1 * | 11/2002 | Robertson et al. | 715/776 |
| 6,587,128 B2 * | 7/2003 | Kanevsky et al. | 715/768 |
| 6,613,100 B2 * | 9/2003 | Miller | 715/526 |
| 6,683,633 B2 * | 1/2004 | Holtzblatt et al. | 715/854 |
| 6,769,019 B2 * | 7/2004 | Ferguson | 709/219 |
| 6,832,355 B1 * | 12/2004 | Duperrouzel et al. | 715/788 |
| 2002/0054126 A1 * | 5/2002 | Gamon | 345/781 |
| 2002/0054138 A1 * | 5/2002 | Hennum | 345/804 |
| 2003/0090510 A1 * | 5/2003 | Shuping et al. | 345/738 |

FOREIGN PATENT DOCUMENTS

| | | |
|---|---|---|
| EP | 0909070 | 4/1999 |
| FR | 2760110 | 2/1997 |
| JP | 63-062033 | 3/1988 |
| JP | 09-138745 | 5/1997 |
| JP | 09-259128 | 10/1997 |
| JP | 10-133839 | 5/1998 |
| JP | 10134003 | 5/1998 |
| WO | 9843183 | 10/1998 |

OTHER PUBLICATIONS

Ayers et al., "Using Graphic History in Browsing the World Wide Web," Proceedings of the International Conference on World Wide Web, Dec. 1995, pp. 451-459, XP002082850.*

L. Rintjema et al., "Creating an HTML Help System for Web-based Products", Sep. 23, 1998, 16th Annual International Conference of Computer Documentation Conference Proceedings, pp. 227-233.*

M. Priestley, "Task Oriented or Task Disoriented: Designing a Usable Help Web", Sep. 23, 1998, 16th Annual International Conference of Computer Documentation Conference Proceedings, pp. 194-199.*

L. Tauscher, "Revisitation Patterns in World Wide Web Navigation," Proceedings of the SIGCHI conference on Human factors in computing systems, ACM, Mar. 1997, pp. 1-8.*

U.S. Appl. No. 09/329,460, filed Jun. 10, 1999, entitled "Method, System, and Program for Providing Pages of Information with Navigation and Content Areas".

U.S. Appl. No. 09/350,028, filed Jul. 18, 1999, entitled "System, Method, and Program for Generated Interlinked Pages".

Search Report Summary Application No. GB 0104324.9.

S. Isensee et al., "Displaying Web Pages in Frames", IBM Corporation, IBM Technical Bulletin, vol. 40, No. 11, Nov. 1997, p. 95.

* cited by examiner

METHOD, SYSTEM, AND PROGRAM FOR DISPLAYING PAGES DOWNLOADED FROM OVER A NETWORK IN AN APPLICATION WINDOW

BACKGROUND OF THE INVENTION

1. Field of the Invention

The present invention relates to a method, system, and program for displaying multiple pages of content downloaded from a network, such as the Internet, in a viewer application window.

2. Description of the Related Art

One of the rapidly expanding sources of information and documentation is the "World Wide Web" (WWW) or Internet. Content servers which provide access to information over the Internet typically utilize the Hypertext Transfer Protocol (HTTP). Oftentimes, textual information is implemented in a standard page description language such as the Hypertext Markup Language (HTML). HTML provides basic document formatting and allows the developer to specify "links" to other servers and files. Use of an HTML-compliant client browser involves specification of a link via a Uniform Resource Locator or "URL". Users may access an HTML document from over the Internet and then use an HTML or web browser to display the downloaded file. The advantage of such HTML browsers is that they can execute on many different computing environments and numerous types of operating systems. Thus, an information provider need only code a document in HTML to make that document available to just about every computing platform that provides Internet access.

HTML documents may include hypertext links, which are implemented as a display icon or a highlighted textual indicator. The HTML link represents a URL address of another related HTML page of information. When a user selects a hypertext link with an input device, such as a mouse, the HTML browser generates a URL request for the document, such as the HTML page, that is addressed by the URL address. The URL can address a document at the same web site from which the current document came or from another different web site. Additionally, hypertext links can address locations within the current document to allow the user to "jump" to various places within the document without having to manually search the document for the referenced location.

A document or related pages, such as different newspaper columns from the same edition, may be presented across multiple HTML pages. Each page would typically include HTML links. In this way, web site designers can disperse related information across HTML web pages to allow users to navigate through different sections of a document using the HTML links. For instance, the web site designer may encode a page or discrete section of a book or manual on different HTML pages or separate newspaper articles from a newspaper on separate HTML pages. Typically, an HTML page includes a navigation area that provides HTML links to different parts of the same document or the next, previous, or related pages.

One of the important considerations in designing the graphical user interface of the Web browser is the manner in which users can navigate through previously accessed Web pages. For instance, in both the Microsoft Internet Explore and Netscape Communicator browsers,** users can select a "Back" button displayed in the menu bar of the browser window or a mouse button programmed as the "back" button to review the page previously viewed. The reason for this feature is that often when viewing a page, the reader will select a link within the page to view the content at the link, yet the reader will want to immediately return to the page from which they selected the link, i.e., the jumping-off page. There are disadvantages with the current art "Back" button solution. One is that when selecting a link, the browser may take time to fully load the next page. However, while the new page is loading, the contents of the page from which the link was selected may not be viewable, resulting in "idle" time. Such delays and idle time are especially problematic when the user's Internet connection is slow, i.e., a 56K modem, or when the server is overloaded. Further, if the reader just wanted to quickly view the linked page and return back to the page including the link, then the reader may experience delays in waiting for the page at the link to be downloaded. In returning to the previously displayed page, there may be delays in rendering the page or downloading all or part of the previous page. However, there may be no download delays if the previous page was cached by the web browser, unless some parts of the cached page have to be downloaded again, thereby causing further delays in moving back to the previous page.

**NETSCAPE is a registered trademark of the Netscape Communications Corporation; WINDOWS and MICROSOFT are registered trademarks of Microsoft Corporation; OS/2 is a registered trademark of International Business Machines Corporation; JAVA is a trademark of Sun Microsystems, Inc.

One prior art technique currently used is to open another browser application window, so there is an additional instance of the browser running in the system, and display the new page in the additional application window. This approach is cumbersome because there is no linkage between the opened application window and the browser application window from which the link was selected. Still further, the display of the opened application window may overlap the current application window requiring the user to toggle between windows to view the contents or to take action to cause the windows to be displayed side-by-side. This all requires additional user action. Further, the reader must be sure to close additional opened application windows otherwise too many open application windows could deplete system resources and degrade performance.

Another prior art technique is to display links on one side of a pane in a browser window and display the contents in a right pane. FIG. 1 illustrates how the Microsoft Internet Explorer displays hypertext links of search results in a left window pane 2 and the content of a selected link is displayed in the right pane 4. However, the selection of a link from the page displayed in the right pane will display the new page in the right pane 4. To go back to the parent page, the reader would have to use the prior art "Back" button approach.

Another prior art technique is to write HTML pages using HTML framing commands. FIG. 2 illustrates a typical use of framing in the Christian Science Monitor's web site. The left panel 10 includes links to different articles. Selection of a link in the left panel 10 displays the page at the link in the right panel 12. Selection of a link in the right panel 12 would display the linked page in the right pane 121, replacing the page from which the link was selected. Again to go back to the parent page, the "Back" button must be used. However, framing requires the use of specialized HTML tags that many web pages do not use and that many believe are cumbersome to implement.

Thus, there is a need in the art for an improved user interface for navigating web pages, especially with regards to viewing previously viewed pages.

SUMMARY OF THE PREFERRED EMBODIMENTS

To overcome the limitations in the prior art described above, preferred embodiments disclose a method, system, and program for displaying pages in a viewer program on a computer display monitor. The viewer program displays an application window. The viewer program downloads a first and second pages from one of multiple servers over a network and then automatically concurrently displays the first page in a first window pane and the second page in a second window pane in the application window according to predefined settings specifying how pages are to be displayed in the first and second panes. The viewer program then downloads a third page from one of multiple servers over the network and automatically concurrently displays the third page in one of the first and second panes and one of the first and second pages in the other pane according to the predefined settings. A fourth page is then downloaded from one of multiple servers over the network and the viewer program then automatically concurrently displays the third and fourth pages in the first and second panes according to the predefined settings.

In further embodiments, the viewer program caches previously downloaded pages in the order in which they were downloaded from the network. A user input command to display a previously displayed page is received. In response to the input command, the viewer program automatically concurrently displays the previously displayed page in the first pane and the first page in the second pane according to the predefined settings.

In still further embodiments, the viewer program receives user selection of a hypertext link within one of the displayed pages and accesses the page addressed by the hypertext link. The viewer program then automatically concurrently displays the page currently displayed in the second pane in the first pane and displays the page addressed by the hypertext link in the second pane if the user selected the hypertext link from the second pane. Alternatively, the viewer program automatically concurrently displays the page currently displayed in the first pane in the first pane and displays the page addressed by the hypertext link in the second pane if the user selected the hypertext link from the first pane.

In yet further embodiments, the viewer program is capable of displaying the downloaded pages in the first and second panes according to the predefined settings even when the pages downloaded from over the network do not include any page commands to cause the display of pages in separate panes within the application window.

Preferred embodiments provide an improved layout and interface in a browser or viewer program to display pages of content downloaded from a network, such as the Internet, that accommodates known user viewing preferences. For instance, Internet users often like to view a page that is linked-to from the current page they are viewing and then immediately return to the page from which the link was selected. Preferred embodiments provide a viewer layout design that will automatically accommodate this common preference by allowing the display of two pages in two separate panes, such as the current page and the next selected page, which may be selected from a link in the current page. Preferred embodiments provide a "book-like" feel to the display in that the current and previous pages are displayed.

In preferred embodiments, the viewer program automatically provides this "book-like" display of multiple pages concurrently based on predefined settings that do not require any user involvement. Further, the preferred embodiment layout design will allow HTML pages to be displayed in multiple panes within the application window even if the HTML pages do not include HTML framing commands. In this way, the preferred embodiments allow the automatic display of multiple HTML pages in a window in separate panes, without user involvement and without requiring content providers to complicate the coding of their HTML pages with framing commands, which many find cumbersome to use.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
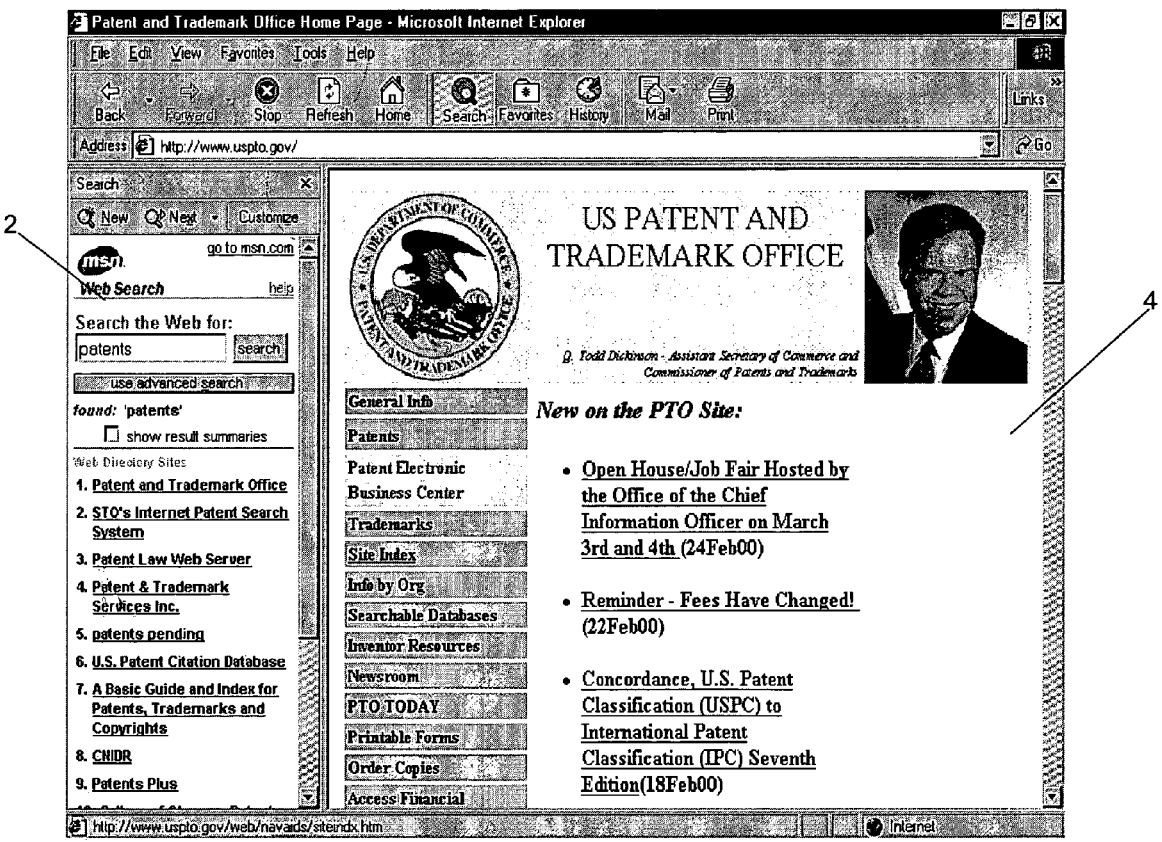
FIGS. 1 and 2 illustrate techniques for navigating web pages in a manner known in the art (the content displayed in FIGS. 1 and 2 may be subject to copyright protection)
Figure 2:
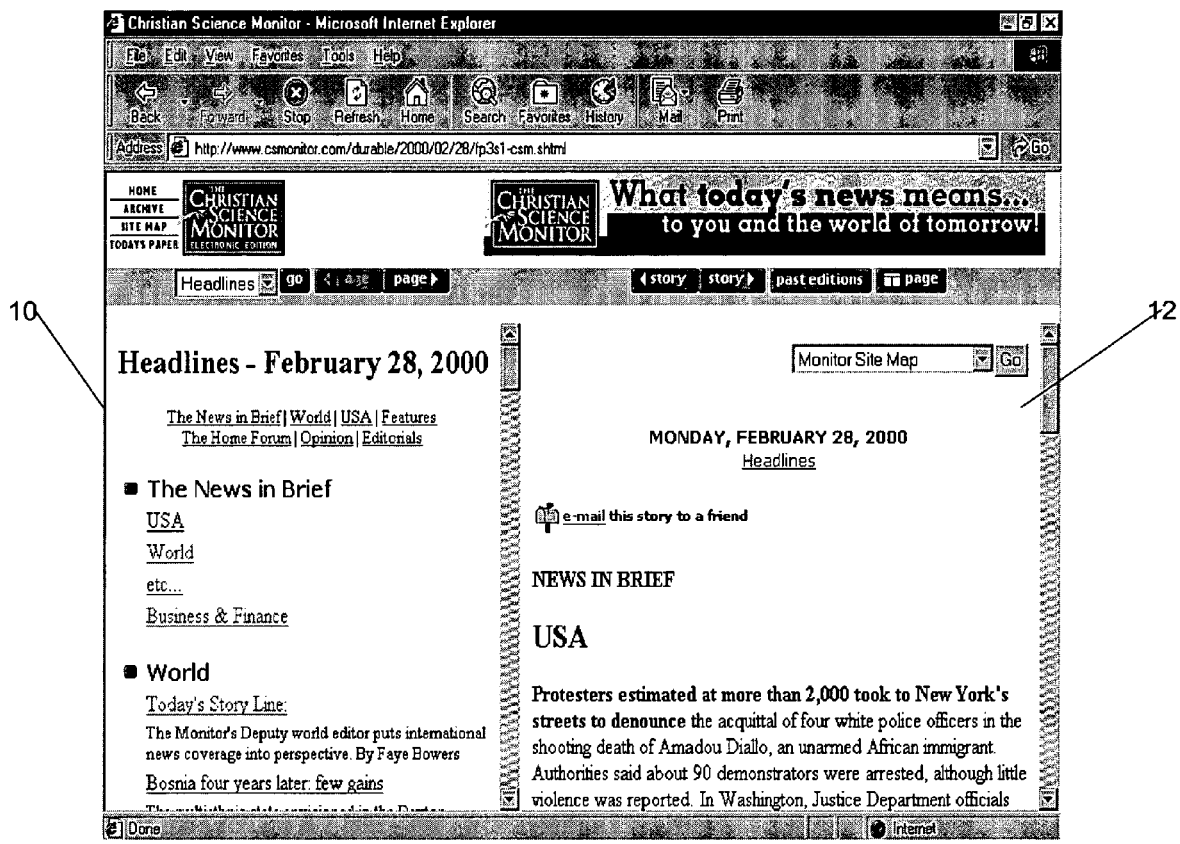
Figure 3:
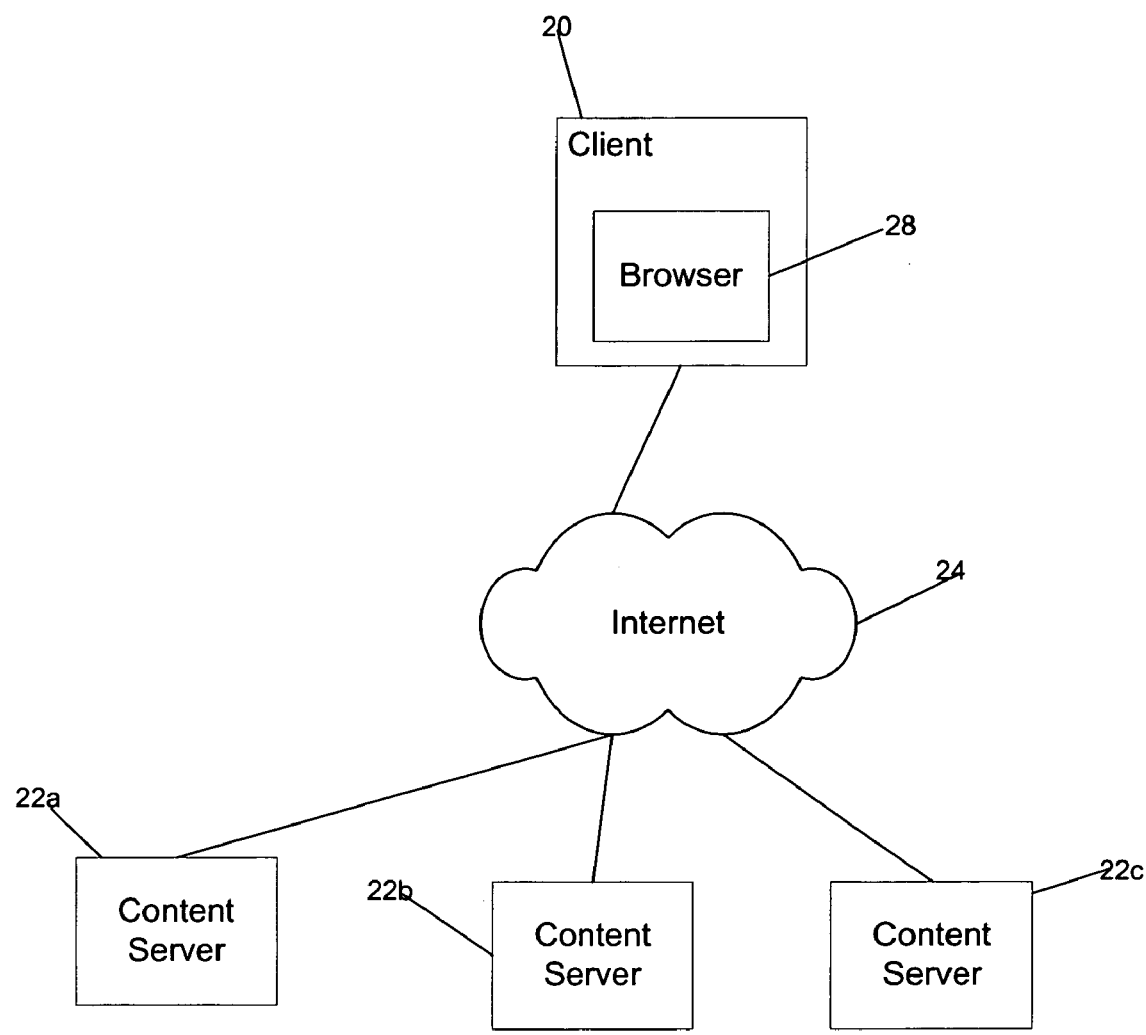
FIG. 3 illustrates a computing environment in which preferred embodiments in accordance with the present invention are implemented.

FIG. 3 illustrates a network computing environment in which preferred embodiments are implemented. A client computer 20 communicates with one or more content servers 22a, b, c providing content in the form of HTML pages or other content, e.g., images, PDF files, video, Java programs, sound files, etc., to requesting clients over the Internet 24 in a manner known in the art. The term "pages" as used herein refers to any type of data structure known in the art capable of presenting information, wherein the information may be implemented in any media format known in the art, such as text, audio, video images, still images, animation, three-dimensional images, etc. The client computer 20 includes a Web browser program 28 e.g., NETSCAPE Communicator, the MICROSOFT Internet Explorer, Spry Mosaic, NCSA Mosaic, Lynx, Opera, GNUscape Navigator, etc., that includes HTTP software to function as an HTTP client to transfer document requests to the content servers 22a, b, c. In alternative embodiments, the content may be distributed over a network other than the Internet, such as a LAN or Intranet.

Figure 4:
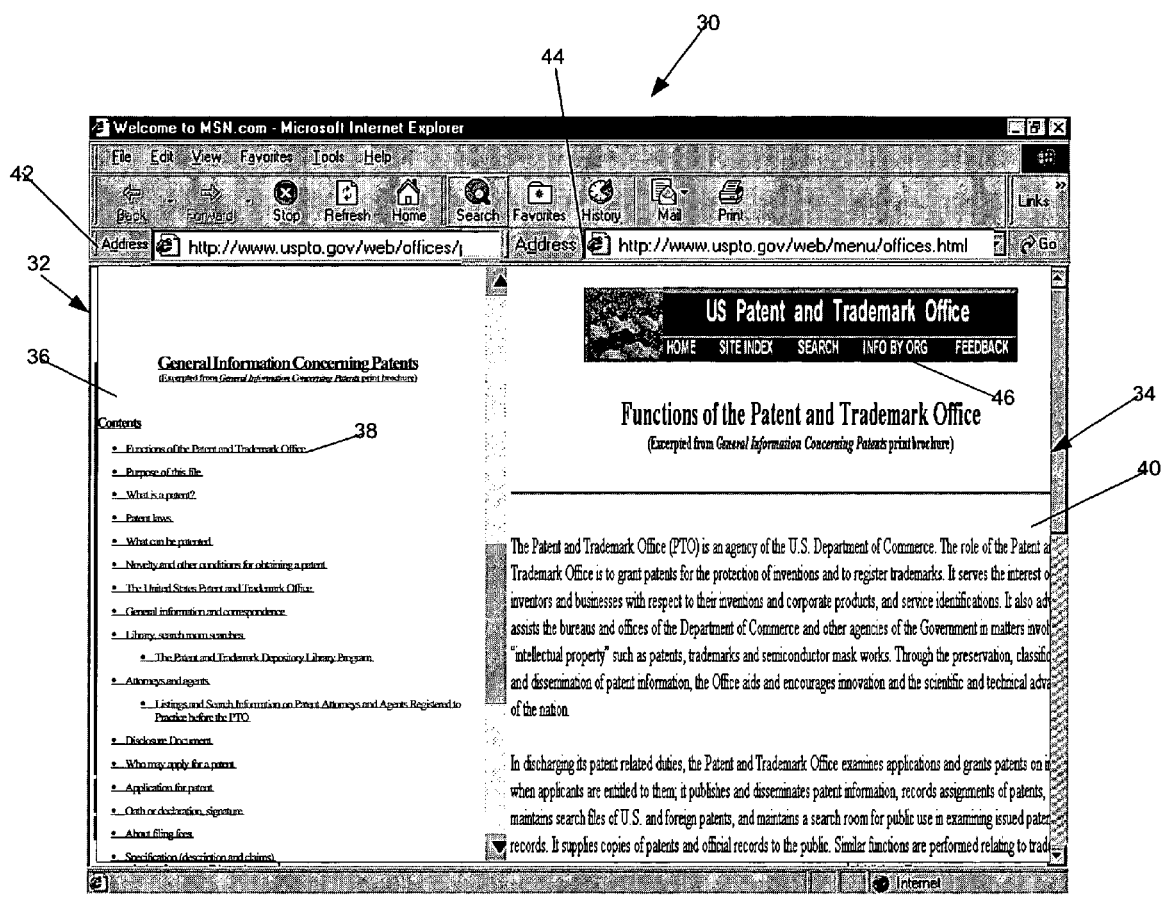
FIGS. 4 and 5 illustrate the layout of a browser application window in accordance with preferred embodiments of the present invention (the content displayed in FIGS. 3 and 4 may be subject to copyright protection)
Figure 5:
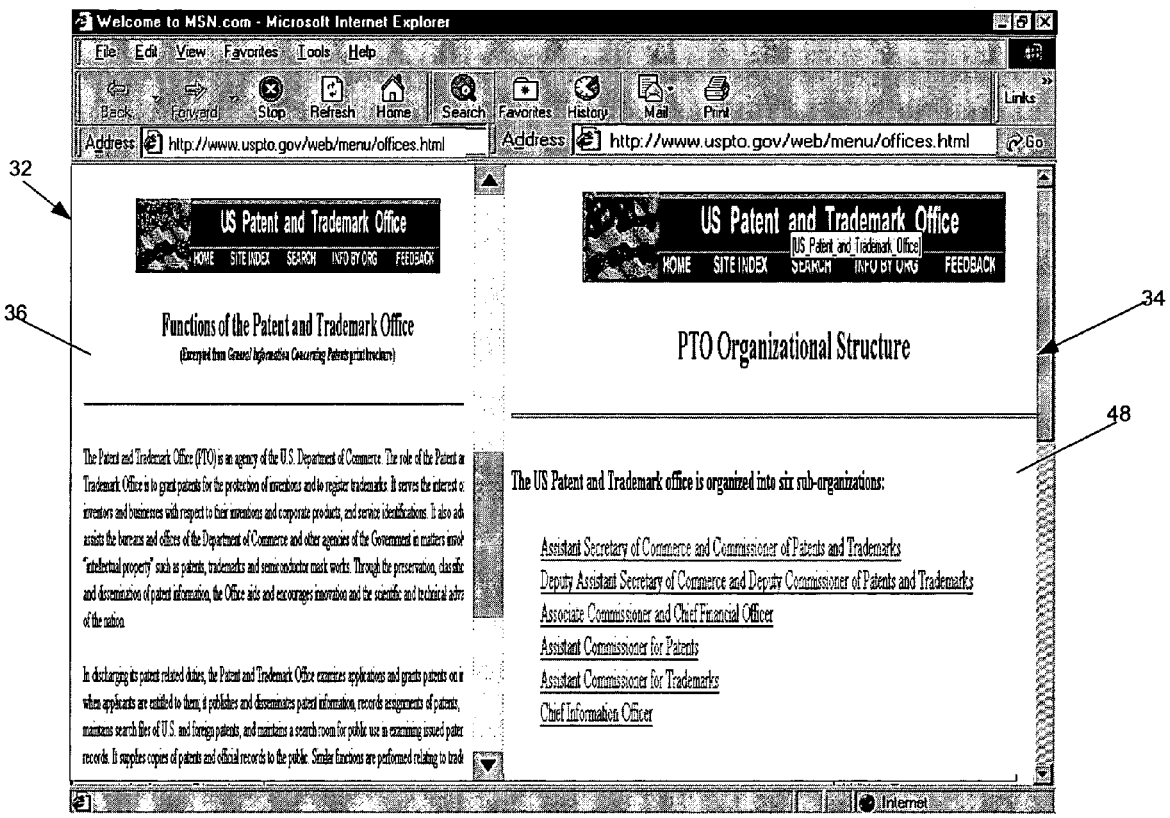

FIGS. 4 and 5 illustrate a preferred embodiment layout of window panes displayed in the web browser program 28 application window. FIG. 4 shows a web browser application window 30 that displays the screen area split into two separate window panes 32 and 34. Each window pane 32 and 34 is capable of displaying a page from a different URL path and is separately scrollable in both the horizontal and vertical directions. With respect to FIG. 4, pane 32 displays page 36. If the user selected the link 38 in page 36, then page 40 specified in the hypertext link 38 would be displayed in the right pane 34. Each pane 32 and 34 includes an address display field 42 and 44, respectively, to display the URL address of the page currently displayed in the pane. In preferred embodiments, selection of a hypertext link in the right pane 34, such as link 46, would result in the display shown in FIG. 5, where the content of page 40 is shifted to display in the left pane 32 and the content of the new page 48 identified in the hypertext link 46 is displayed in the right pane 34.

With the preferred layout, illustrated in FIGS. 4 and 5, web pages are displayed as pages in a book are displayed, such that two pages are displayed side by side. In this way, if the user is selecting hypertext links from an initial page, the initial page remains displayed. Numerous possibilities for how to display pages in the two panes are possible. Further the user may select modes of display, such as select to only display one pane or two panes.

Figure 6:
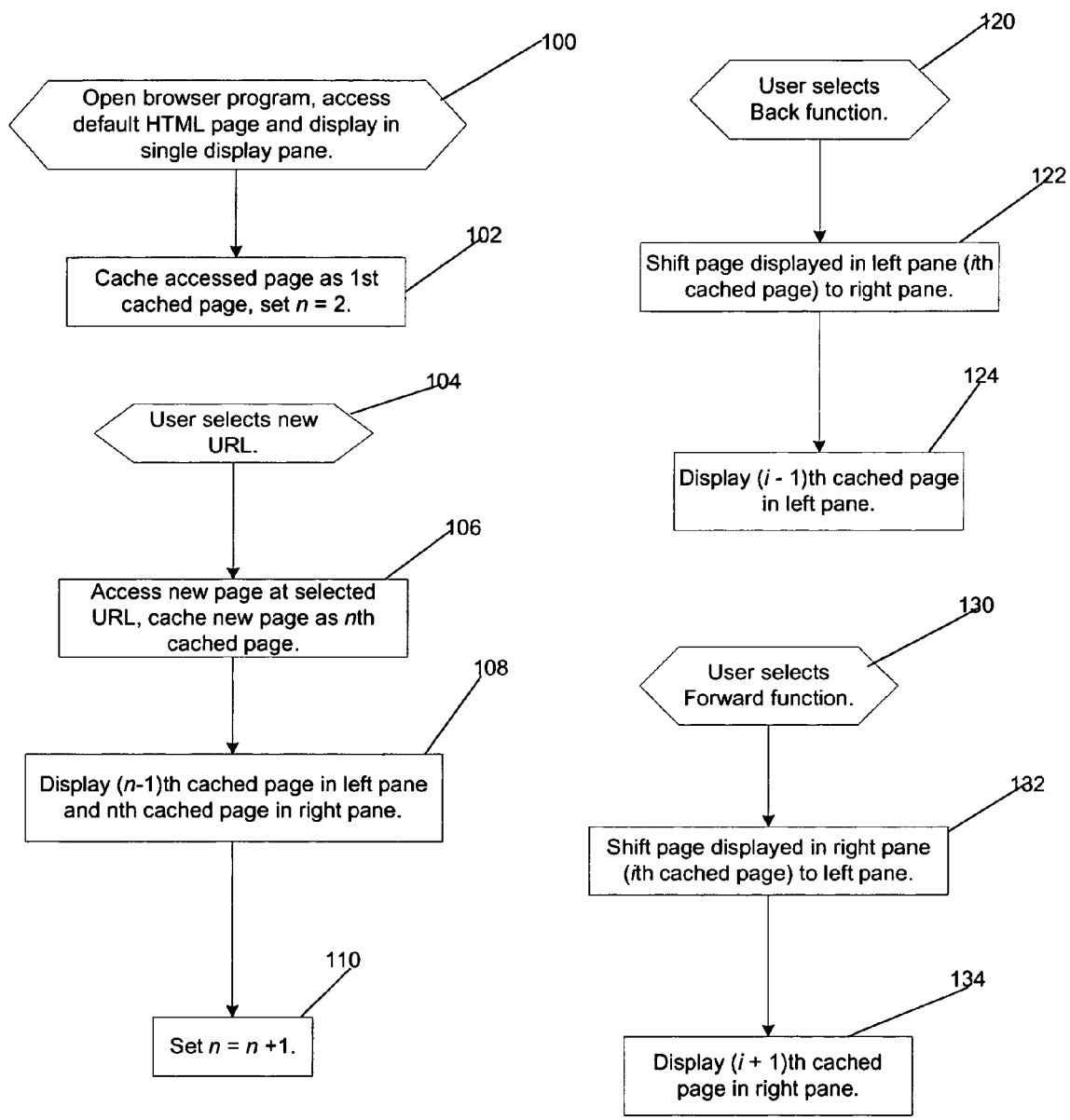
FIGS. 6 and 7 illustrate logic implemented in the browser application to display downloaded pages in accordance with preferred embodiments of the present invention.

FIG. 6 illustrates logic implemented in the browser program 28 to display pages in the two panes 32 and 34. Control begins at block 100 with the browser program 28 opening, accessing the default HTML page from over the Internet 24, and displaying the page in a single pane window. This default page is cached (at block 102) as the first cached page and n, indicating the number of cached pages, is set to two for the next cached page. Upon the user selecting a new URL from one of the displayed pages, a bookmark or entering the URL in an address field (at block 104), the browser program 28 accesses (at block 106) the new page from over the Internet 24 or network at the URL and caches the new page as the nth cached page. The browser program then displays (at block 108) the (n−1)th cached page, which may be currently displayed in one of the panes 32 or 34, in the left pane 32 and displays the new nth cached page in the right pane. Thus, in this embodiment, the newer page is displayed on the right panel 34 and the previous or older page is displayed in the left panel 32. This provides a "book-like" look-and-feel where two consecutive pages are displayed at once. The browser program 28 then increments n (at block 110) for the next cached page.

FIG. 6 also describes the manner in which the web browser 28 responds to user selection of the Back or Forward functions when two panels are displayed. The user selection of the Back or Forward function may be from selection of a displayed Back or Forward button in the browser application window 30, or selection of a mouse button or menu item. Upon the user selecting the Back function (at block 120), the browser program 28 shifts (at block 122) the page displayed in the left pane 32, or ith cached page, to the right pane 34 and displays (at block 124) the (i−1)th cached page in the left pane 34, like turning back a page in a book. Upon the user selecting the Forward function (at block 130), the browser program 28 shifts (at block 132) the page displayed in the right pane 34, or ith cached page, to the left pane 32 and displays (at block 124) the (i+1)th cached page in the right pane 34, like moving forward a page in a book.

Figure 7:
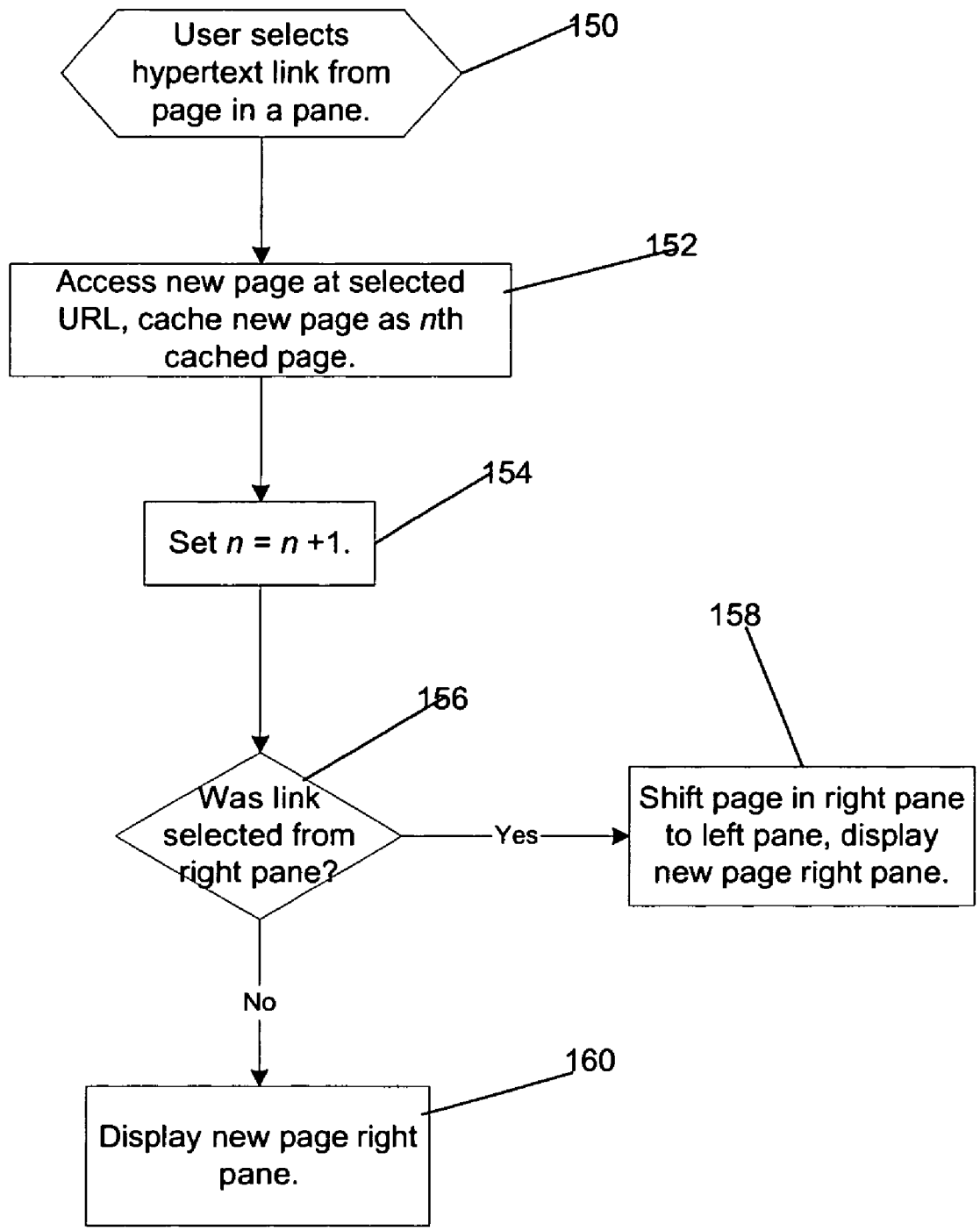

FIG. 7 illustrates logic implemented in the browser program 28 for an alternative embodiment of displaying pages in the left 32 and right 34 panes when the user selects a hypertext link from one of the displayed pages. Upon the user selecting a hypertext link from one of the displayed pages (at block 150), the web browser 28 accesses (at block 152) the new page at the URL in the hypertext link, caches the new page as the nth cached page, and increments n (at block 154) for the next cached page. If the link was selected from the right pane 34 (at block 156), then the browser program 28 shifts (at block 158) the page in the right pane to the left pane and displays the new page in the right pane. Otherwise, the new page is displayed in the right pane 32. With the approach of FIG. 7, a page from which links are selected is always displayed. Further, if the page from which the link is selected is in the right pane, then that page is moved to the left and the new page is displayed in the right pane. In this way, the right pane displays the linked to page, and the linked from page is always displayed in the left pane.

In a still further alternate embodiment, the web browser 28 could be programmed to display a new page selected from a hypertext link in a currently displayed page in the pane opposite from the pane including the selected hypertext link. In this way, the current displayed page from which the hypertext link is selected remains displayed in the same pane. For instance, if the user selected a hypertext link from the left pane 32, then the new page would be displayed in the right pane 34 or if the user selected a hypertext link from the right pane 34, then the new page would be displayed in the left pane 32. The advantage of this arrangement is that the currently displayed page from which the hypertext link is selected does not have to be rendered again as it remains displayed in its current pane. The only delays then are in downloading or retrieving from cache the selected page and rendering the page in the opposite pane.

The above web browser layout for displaying pages has many advantages over current browser layouts. One advantage is that the browser automatically displays, without any user involvement, a view of the immediately preceding page. As mentioned, readers often want to return to a page from which a link and new page is selected. With the preferred embodiments, the page from which a link is selected remains displayed even while the new page is being downloaded or after it is displayed. In this way, the user may view the previous page without having to use the Back function or perform any GUI operation as the previous page remains displayed. Further, the reader may view the previous page as the other page is downloading into the other pane, thus eliminating any idle time.

Another advantage is that the preferred embodiment technique allows HTML pages that do not include the special HTML framing commands to automatically be displayed in separate frames. Thus, multiple panes or frames are used to maximize the display of information without requiring that content developers use HTML frame commands, which many consider difficult, or revise their pages to include HTML frame commands. With the preferred embodiments, the browser handles the distribution of pages in multiple frames, thus simplifying the programming tasks for content providers. The browser determines how pages are distributed in the multiple panes based on predefined settings, which may be alterable by the user. However, once the settings are made, the browser automatically provides the view of multiple pages without any user involvement. Thus, the preferred embodiments automatically provide the user the display of a new page and the previously viewed page based on predefined settings to automatically provide what otherwise must be accomplished using input selections.

Moreover, as screen displays increase in size, multiple panels can be used to display multiple web pages without substantially reducing the amount of information displayed.

Further, content providers can provide links to third party web sites without having to worry that the reader will lose the current page as the current page will be displayed in one of the panes. Moreover, because the linked-to page is displayed in a separate pane, there is less of a chance that the user will associate the content provider with the "linked-to" page. Content providers are concerned that not only will readers associate the linked-to page with the content provider, but also that readers will believe that the content provider is associated with the page including the hypertext link to their page. The preferred embodiments minimizes any association concerns because the use of separate panes to display the pages provides physical separation of the material which reduces the likelihood of association.

The preferred embodiment multiple pane approach is also an improvement over current art techniques which display the linked-to page in a new browser application window because the additional browser application window will often block the view of the initial browser application window displaying the previous page. Further, opening additional browser application windows consumes significant system resources and requires the user to close browser application windows to avoid running dangerously low on system resources. With the preferred multiple pane approach, multiple pages are displayed in a non-overlapping manner and without requiring significant system resources because the additional pane is displayed within the same browser application window, thus using current browser system resources. Still further, in the preferred embodiment approach, there is a link or connection between previously displayed pages and current pages, allowing the user to move backwards or forward through the downloaded pages. This is not an option when opening an additional application window to display the new page as there is no connection between pages displayed in separate application windows.

ALTERNATIVE EMBODIMENTS AND CONCLUSIONS

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

In preferred embodiments, the browser program displays two panes to display a current page and the preceding page. In further embodiments there may be additional panels to allow further pages to be displayed simultaneously. This implementation involving three or more pages becomes feasible as the size of the display monitor increases, thereby allowing more information to be displayed in any single display pane.

Preferred embodiments described an order in which the current displayed page transfers to another pane when a new page is downloaded. However, in alternative embodiments, the direction that a page shifts as a new page is downloaded may vary.

Preferred embodiments were described with respect to presenting information in pages conforming to the HTML file format. However, alternative file formats for building web-like pages may be used, such as Dynamic Hypertext Mark-Up Language (DHTML), the Extensible Markup Language (XML), Cascading Sytle Sheets, any other Standard Generalized Markup Language (SGML), or any other language known in the art for creating interchangeable, structured documents. Further, any version of HTML may be used, including version 2.0, 3.2, 4.0, etc. In yet further embodiments, the requested file may be in any other file format, i.e., other than an SGML type format, capable of being displayed or otherwise downloaded and displayed in the browser application.

Preferred embodiments were described with respect to a network environment in which pages are provided to a client from a server over a network, such as the Internet. However, in alternative embodiments the web browser including the preferred embodiment multiple pane display approach may be maintained within and used by a single computing device, such as a computer with a hard disk drive.

In preferred embodiments, the program downloading and displaying pages from over the network was implemented in a Web browser type program. However, the preferred embodiment display layout technique may be implemented in any type of viewer program, not just a Web browser, that is capable of downloading and displaying the content of pages from over a network such as the Internet. Still further, if the downloaded pages do not include graphics or text to display, such as the case with a sound file, then the web browser would display a representation of the non-visual content in one of the panes.

In summary, the present invention provides a system, method, and program for displaying pages in a viewer program on a computer display monitor. The viewer program displays an application window. The viewer program downloads a first and second pages from one of multiple servers over a network and then automatically concurrently displays the first page in a first window pane and the second page in a second window pane in the application window according to predefined settings specifying how pages are to be displayed in the first and second panes. The viewer program then downloads a third page from one of multiple servers over the network and automatically concurrently displays the third page in one of the first and second panes and one of the first and second pages in the other pane according to the predefined settings. A fourth page is then downloaded from one of multiple servers over the network and the viewer program then automatically concurrently displays the third and fourth pages in the first and second panes according to the predefined settings.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for displaying pages in a viewer program on a computer display monitor, wherein the viewer program displays an application window, comprising:

downloading a first and second pages from one of multiple servers over a network;

automatically concurrently displaying the first page in a first pane and the second page in a second pane in the application window according to predefined settings specifying how pages are to be displayed in the first and second panes;

downloading a third page from one of multiple servers over the network;

automatically concurrently displaying the third page in one of the first and second panes and one of the first and second pages in the other pane according to the predefined settings;

downloading a fourth page from one of multiple servers over the network;

automatically concurrently displaying the third and fourth pages in the first and second panes according to the predefined settings;

receiving user selection of a hypertext link within one of the displayed pages;

accessing the page addressed by the hypertext link;

automatically concurrently displaying the page currently displayed in the second pane in the first pane and displaying the page addressed by the hypertext link in the second pane if the user selected the hypertext link from the second pane;

automatically concurrently displaying the page currently displayed in the first pane and displaying the page addressed by the hypertext link in the second pane if the user selected the hypertext link from the first pane; and wherein the viewer program is capable of displaying the downloaded pages in the first and second panes according to the predefined settings when the pages downloaded from over the network do not include any page commands to cause the display of pages in separate panes within the application window.

2. The method of claim 1, wherein the first pane is displayed adjacent and to the left of the second pane, wherein automatically concurrently displaying the third page and one of the first and second pages comprises concurrently displaying the second page in the first pane and the third page in the second pane.

3. The method of claim 1, further comprising:

caching previously downloaded pages in the order in which they were downloaded from the network;

receiving a user input command to display a previously displayed page; and automatically concurrently displaying the previously displayed page in the first pane and the first page in the second pane according to the predefined settings in response to the user input command to display the previously displayed page.

4. The method of claim 3, wherein the first pane is displayed adjacent and to the left of the second pane.

5. The method of claim 1, further comprising:

caching previously downloaded pages in the order in which they were downloaded from the network;

receiving a user input command to display a subsequent page cached after the first and second pages were downloaded; and automatically concurrently displaying the subsequent page in the second pane and the second page in the first pane according to predefined settings in response to the user input command to display the previously displayed page.

6. The method of claim 1, wherein the first pane is displayed adjacent and to the left of the second pane.

7. The method of claim 1, further comprising:

receiving user selection of a hypertext link within one of the displayed pages in one of the panes;

accessing the page addressed by the hypertext link; and automatically concurrently displaying the page addressed by the hypertext link in the pane opposite the pane displaying the page from which the hypertext link was selected the page from which the link was selected in its current pane.

8. A system for displaying pages in a viewer program on a computer display monitor, wherein the viewer program displays an application window, comprising:

means for downloading a first and second pages from one of multiple servers over a network;

means for automatically concurrently displaying the first page in a first pane and the second page in a second pane in the application window according to predefined settings specifying how pages are to be displayed in the first and second panes;

means for downloading a third page from one of multiple servers over the network;

means for automatically concurrently displaying the third page in one of the first and second panes and one of the first and second pages in the other pane according to the predefined settings;

means for downloading a fourth page from one of multiple servers over the network;

means for automatically concurrently displaying the third and fourth pages in the first and second panes according to the predefined settings;

means for receiving user selection of a hypertext link within one of the displayed pages;

means for accessing the page addressed by the hypertext link;

means for automatically concurrently displaying the page currently displayed in the second pane in the first pane and displaying the page addressed by the hypertext link in the second pane if the user selected the hypertext link from the second pane;

means for automatically concurrently displaying the page currently displayed in the first pane and displaying the page addressed by the hypertext link in the second pane if the user selected the hypertext link from the first pane; and wherein the means for displaying the downloaded pages in the first and second panes according to the predefined settings is capable of displaying the pages in the first and second panes when the pages downloaded from over the network do not include any page commands to cause the display of pages in separate panes within the application window.

9. The system of claim 8, wherein the first pane is displayed adjacent and to the left of the second pane, wherein the means for automatically concurrently displaying the third page and one of the first and second pages concurrently displays the second page in the first pane and the third page in the second pane.

10. The system of claim 8, further comprising:

means for caching previously downloaded pages in the order in which they were downloaded from the network;

means for receiving a user input command to display a previously displayed page; and means for automatically concurrently displaying the previously displayed page in the first pane and the first page in the second pane according to the predefined settings in response to the user input command to display the previously displayed page.

11. The system of claim 10, wherein the first pane is displayed adjacent and to the left of the second pane.

12. The system of claim 8, further comprising:

means for caching previously downloaded pages in the order in which they were downloaded from the network;

means for receiving a user input command to display a subsequent page cached after the first and second pages were downloaded; and means for automatically concurrently displaying the subsequent page in the second pane and the second page in the first pane according to predefined settings in response to the user input command to display the previously displayed page.

13. The system of claim 8, wherein the first pane is displayed adjacent and to the left of the second pane.

14. The system of claim 8, further comprising:

means for receiving user selection of a hypertext link within one of the displayed pages in one of the panes;

means for accessing the page addressed by the hypertext link; and means for automatically concurrently displaying the page addressed by the hypertext link in the pane opposite the pane displaying the page from which the hypertext link was selected the page from which the link was selected in its current pane.

15. An article of manufacture for use in displaying electronic pages in a viewer program application window on a computer display monitor, wherein the article of manufacture comprises at least one computer program that is capable of causing a computer to perform:

downloading a first and second pages from one of multiple servers over a network;

automatically concurrently displaying the first page in a first pane and the second page in a second pane in the application window according to predefined settings specifying how pages are to be displayed in the first and second panes;

downloading a third page from one of multiple servers over the network;

automatically concurrently displaying the third page in one of the first and second panes and one of the first and second pages in the other pane according to the predefined settings;

downloading a fourth page from one of multiple servers over the network;

automatically concurrently displaying the third and fourth pages in the first and second panes according to the predefined settings; and receiving user selection of a hypertext link within one of the displayed pages;

accessing the page addressed by the hypertext link;

automatically concurrently displaying the page currently displayed in the second pane in the first pane and displaying the page addressed by the hypertext link in the second pane if the user selected the hypertext link from the second pane;

automatically concurrently displaying the page currently displayed in the first pane and displaying the page addressed by the hypertext link in the second pane if the user selected the hypertext link from the first pane; and wherein the viewer program is capable of displaying the downloaded pages in the first and second panes according to the predefined settings when the pages downloaded from over the network do not include any page commands to cause the display of pages in separate panes within the application window.

16. The article of manufacture of claim 15, wherein the first pane is displayed adjacent and to the left of the second pane, wherein automatically concurrently displaying the third page and one of the first and second pages comprises concurrently displaying the second page in the first pane and the third page in the second pane.

17. The article of manufacture of claim 15, further comprising:

caching previously downloaded pages in the order in which they were downloaded from the network;

receiving a user input command to display a previously displayed page; and automatically concurrently displaying the previously displayed page in the first pane and the first page in the second pane according to the predefined settings in response to the user input command to display the previously displayed page.

18. The article of manufacture of claim 17, wherein the first pane is displayed adjacent and to the left of the second pane.

19. The article of manufacture of claim 15, further comprising:

caching previously downloaded pages in the order in which they were downloaded from the network;

receiving a user input command to display a subsequent page cached after the first and second pages were downloaded; and automatically concurrently displaying the subsequent page in the second pane and the second page in the first pane according to predefined settings in response to the user input command to display the previously displayed page.

20. The article of manufacture of claim 15, wherein the first pane is displayed adjacent and to the left of the second pane.

21. The article of manufacture of claim 15, further comprising:

receiving user selection of a hypertext link within one of the displayed pages in one of the panes;

accessing the page addressed by the hypertext link; and automatically concurrently displaying the page addressed by the hypertext link in the pane opposite the pane displaying the page from which the hypertext link was selected the page from which the link was selected in its current pane.

* * * * *